(12) United States Patent
Iles et al.

(10) Patent No.: US 6,365,982 B1
(45) Date of Patent: Apr. 2, 2002

(54) APPARATUS AND METHOD FOR POSITIONING AN ENGINE THROTTLE

(75) Inventors: Robert Iles; Robert D. Kern, both of Waukesha; Michael T. Orlikowski, East Troy; Gerald C. Ruehlow, Oconomowoc; Bijun Shi, Madison; Francis X. Wedel, Lake Mills, all of WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 09/281,255

(22) Filed: Mar. 30, 1999

(51) Int. Cl.[7] .............................. F02N 11/06; H02P 9/04
(52) U.S. Cl. ................. 290/40 B; 290/40 R; 290/40 A; 290/40 C; 290/40 D; 290/40 F
(58) Field of Search .............................. 290/40 A–40 F

(56) References Cited

U.S. PATENT DOCUMENTS

| | | | |
|---|---|---|---|
| 3,767,972 A | * 10/1973 | Noddings et al. | 322/32 |
| 4,057,130 A | * 11/1977 | Robertson | 192/3 |
| 4,541,378 A | 9/1985 | Kitamura | 123/333 |
| 4,543,927 A | * 10/1985 | Luhn et al. | 123/182 |
| 4,691,521 A | * 9/1987 | Hirabayashi et al. | 60/602 |
| 4,915,074 A | 4/1990 | Arai | 123/339 |
| 4,991,552 A | * 2/1991 | Luft et al. | 123/401 |
| 5,003,948 A | 4/1991 | Churchill et al. | 123/361 |
| 5,003,949 A | * 4/1991 | Fanner et al. | 123/382 |
| 5,033,433 A | 7/1991 | Churchill et al. | 123/361 |
| 5,146,889 A | * 9/1992 | Swanson et al. | 123/376 |
| 5,235,943 A | 8/1993 | Firoenza, II | 123/179 |
| 5,273,016 A | * 12/1993 | Gillespie et al. | 123/403 |
| 5,287,835 A | 2/1994 | Fiorenza, II et al. | 123/179 |
| 5,317,999 A | 6/1994 | Kern et al. | 123/182 |
| 5,376,877 A | 12/1994 | Kern et al. | 322/32 |
| 5,497,735 A | 3/1996 | Kern et al. | 123/90.6 |
| 5,504,417 A | 4/1996 | Kern et al. | 322/32 |
| 5,513,611 A | 5/1996 | Ricourard | 123/399 |
| 5,526,787 A | * 6/1996 | Pallet | 123/399 |
| 5,651,343 A | 7/1997 | Evans et al. | 123/399 |

* cited by examiner

*Primary Examiner*—Elvin Enad
(74) *Attorney, Agent, or Firm*—Boyle Frederickson Newholm Stein & Gratz S.C.

(57) ABSTRACT

A method for controlling the speed of an engine driving a generator supplying electrical current to a load includes the steps of monitoring the current, increasing the speed when the current increases and decreasing the speed when the current decreases. The governor apparatus used to carry out the method includes a microcontroller having a current and frequency look-up table embedded in it. For some part of the monitoring step, the engine runs at a first speed, e.g., idle speed, or some moderate speed above idle speed. The increasing step includes detecting an increase in the current to a value, determining from the look-up table the frequency corresponding to the value and increasing the speed of the engine until the frequency of the current is the frequency corresponding to the value. To state it in other words, the new method and apparatus control the engine at a modest speed when the generator is unloaded or lightly loaded and increases engine speed and current frequency with increases in generator load.

17 Claims, 8 Drawing Sheets

APPARATUS AND METHOD FOR POSITIONING AN ENGINE THROTTLE

FIELD OF THE INVENTION

This invention relates generally to internal combustion engines and, more particularly, to engine speed control.

BACKGROUND OF THE INVENTION

Many applications which use an internal combustion engine as the prime mover require that engine speed be held relatively constant. One example is a mobile machine such as a concrete mixer where the work output function, i.e., rotating the mixing drum, is hydraulically powered. The hydraulic pump is engine-driven at constant speed and speed control of the work function is effected by hydraulic valves rather than by controlling engine speed.

Another exemplary application is a walk-behind lawn mower. Particularly on less-expensive mower models, the engine runs at substantially constant speed.

Still another example is an engine-driven electrical generator. As is well known, generator output voltage and frequency are, as a general matter, a function of the rotational speed at which the generator is driven. It is desirable to hold both voltage and frequency within relatively narrow limits.

Very commonly, regulation of engine speed in such applications is by using a mechanical governor of the type known as a flyweight or centrifugal governor. Such a governor has a mechanical lever or linkage coupled to the carburetor butterfly valve. A spring applies force to the linkage in a direction to urge the valve open (and run the engine faster) and the flyweight governor applies force to such linkage in a direction to urge the valve closed. At the nominal regulated speed, the effects of the spring and the flyweight governor balance one another and the engine runs at that speed so long as the load remains unchanged.

But in applications like those described above, engine load routinely changes. For example, a lawn mower encounters grass of differing height or density and the resulting changing load causes engine speed to change. And more or less electrical power will be demanded from a generator and changes in engine speed will result.

A common flyweight governor functions in such a way that engine speed is highest when the engine is at no load or is lightly loaded and decreases as engine load increases. Engine speed at full load may be 12–15% lower than engine speed at no load. This phenomenon is often referred to as speed "droop." When engine speed decreases, so does the available engine horsepower. And if the engine is driving a generator, the generator frequency also declines with decreasing engine speed.

A known approach to engine-generator control (and particularly engine speed control) involves monitoring generator voltage. Since a decrease in such voltage means that engine speed is decreasing, the generator field current is increased to bring the voltage back to some norm. But the resulting increased load often kills the engine. A remedial measure involves reducing field current to reduce the voltage but substantially maintain (or at least prevent a significant decrease in) generator frequency.

Often, an application for a speed-regulated internal combustion engine will exhibit a characteristic loading pattern. The on-board, engine-driven electrical generator installed in many recreational vehicles (RVs) is an example. It is estimated that a high percentage, e.g. 80% or so, of the running time of an RV generator is at or below 50% of rated load. Such a generator may be nearly fully loaded only when most or all of the RV electrical equipment, probably including an air conditioning compressor, is operating simultaneously.

Given the foregoing characteristics of a flyweight governor, this means that in an RV generator, lightly loaded during much of its running time, the engine spends much of its life running at or near its highest speed. This has at least three unfavorable implications.

One is that higher engine operating speed results in reduced engine life. Another is that high engine speed produces a sound level which must either be deadened by installing extra insulation—at additional cost—at the time of manufacture or simply be tolerated by the occupants of the RV. Yet another is that, undesirably, the engine output horsepower declines precisely during the times that maximum or near-maximum horsepower is required.

In view of the invention, none of these eventualities need occur, either at all or at least not nearly to the degree required by earlier engine speed regulation arrangements. The new apparatus and method represent an important advance in the field of engine speed regulation for generator applications.

OBJECTS OF THE INVENTION

It is an object of the invention to provide a new apparatus and method for positioning an engine throttle which address some of the problems and shortcomings of the prior art.

Another object of the invention is to provide a new apparatus and method for positioning an engine throttle which are particularly applicable to engine-driven generators used on recreational vehicles.

Another object of the invention is to provide such a new apparatus and method which reduce engine sound levels at lighter engine loads.

Yet another object of the invention is to provide such a new apparatus and method which help reduce engine wear and extend engine life.

Another object of the invention is to provide such a new apparatus and method which obtain incrementally greater horsepower from the engine.

Another object of the invention is to provide such a new apparatus and method which substantially avoid engine stalling.

Still another object of the invention is to provide such a new apparatus and method which incrementally increase generator frequency with increasing engine load.

Another object of the invention is to provide such a new apparatus and method which generally "match" the engine output horsepower with horsepower demand. How these and other objects are accomplished will become apparent from the following descriptions and from the drawings.

SUMMARY OF THE INVENTION

Aspects of the invention involve a method for controlling the speed of an engine driving a generator which supplies electrical current to a load. The method includes monitoring the magnitude of the current to the load, increasing the speed when the current increases and decreasing the speed when the current decreases. The increasing step includes increasing the speed to a maximum speed when the current increases to a predetermined value such as rated generator full load current. The decreasing step includes decreasing the speed to a minimum speed, e.g., engine idle speed or thereabouts, when the current decreases to a predetermined value, e.g., zero amperes or near zero.

More specifically, the method involves an AC generator, the output current of which has a frequency. For geographical areas where commercial power is at 60 Hz (and clocks and other products are configured in anticipation of such frequency), the frequency at the maximum speed is not in excess of about 65 Hz. And the frequency at the minimum speed is not less than about 55 Hz. In a highly preferred method, the frequencies at maximum and minimum speeds are about 63 Hz and 57 Hz, respectively. And where commercial power is at 50 Hz, the frequency at the maximum speed is not in excess of about 55 Hz and the frequency at the minimum speed is not less than about 45 Hz.

In other aspects of the method, the engine has a throttle valve controlling the rate of fuel flow to the engine. It also has a governor apparatus with a linkage arm coupled to the throttle valve. A force is applied to the linkage arm along a vector and the linkage arm and the vector define an included angle between them. The increasing step includes increasing the included angle and the decreasing step includes decreasing the included angle.

It is most preferable to equip the governor apparatus with a control arm coupled to a positioning motor. This "bell crank" arrangement, described in more detail below, is advantageously used when the positioning motor is very small and of low power. In this configuration, the force is applied by a spring extending between the linkage arm and the control arm. When a positioning motor is used, the increasing step includes powering the positioning motor in a first direction and the decreasing step includes powering the positioning motor in a second direction. Most preferably, there is a spring coupled between the motor and the linkage arm and the force is applied by the spring.

In another aspect of the method, the governor apparatus includes a microcontroller having a current-and-frequency look-up table embedded therein. The engine runs at a low first speed during at least a part of the monitoring step. The increasing step includes detecting an increase in the current to a value, determining from the look-up table the frequency corresponding to the value and increasing the speed of the engine until the frequency of the current is the frequency corresponding to the value.

Other aspects of the invention involve, in combination, an electrical generator having an output terminal and an internal combustion engine powering the generator. The engine includes a throttle valve controlling the rate of fuel flow to the engine.

The improvement comprises a governor apparatus including a linkage arm coupled to the throttle valve, a spring applying a vector force to the linkage arm and a motor mounted with respect to the engine for changing the angle of the vector force with respect to the linkage arm. The motor causes the included angle to increase when the current increases, thereby increasing the speed of the engine.

In a highly preferred embodiment of the combination, the governor apparatus includes the control arm mounted for pivoting movement about a pivot axis. The spring is coupled between the control arm and an attachment point on the linkage arm and the pivot axis and the attachment point are substantially aligned with one another. The aforedescribed current transformer, microcontroller, control and linkage arms and the motor coact to increase the frequency of the current when the magnitude of the current increases.

In other aspects of the combination, the motor is affixed to a mount having a guide track supported on it. A slide is mounted for movement with respect to the guide track, a threaded nut is affixed to the slide and a shaft rotated by the motor is threaded to the nut. When the motor and threaded shaft rotate, the nut and slide travel along a linear path to extend and retract the slide, depending upon whether the motor is rotated in a first or second direction, respectively.

Other details of the invention are set forth in the following detailed description and in the drawings.

DETAILED DESCRIPTIONS OF PREFERRED EMBODIMENTS

Figure 1:
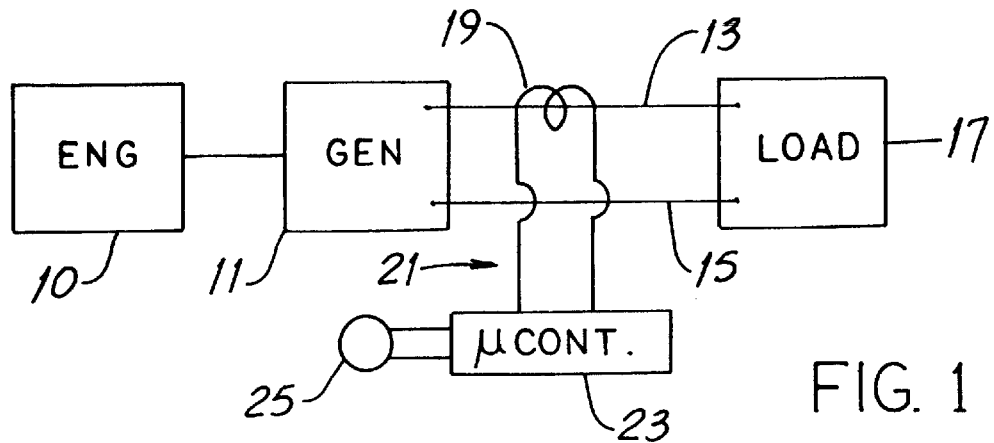
FIG. 1 is a representative diagram showing an engine, generator, load and components used to control engine speed.
Figure 2:
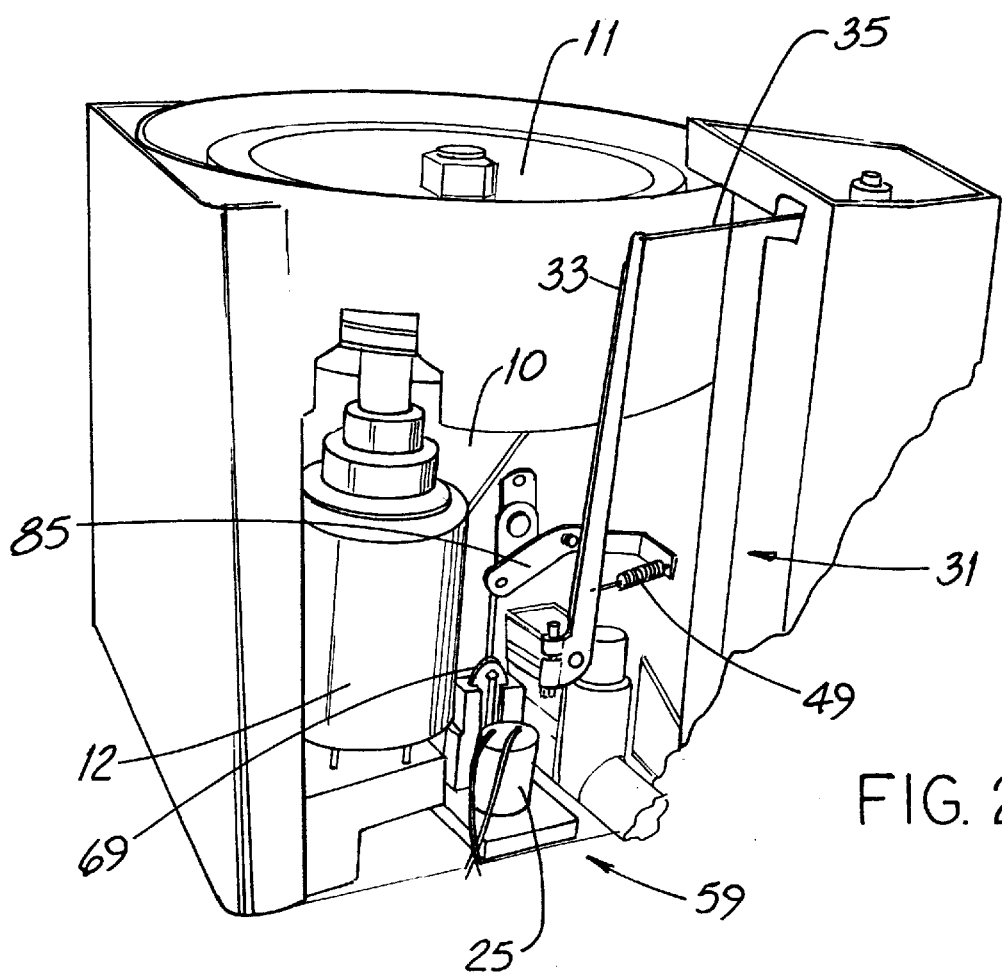
FIG. 2 is a representative perspective view of a new governor apparatus shown in conjunction with an engine, a generator and the engine starter. Parts are broken away.

Referring first to FIG. 1 and 2, an internal combustion engine 10 is mechanically coupled to and drives an AC generator 11. The engine starter 12 is shown in FIG. 2. Two conductors 13, 15 are connected between the generator output terminals and a load 17 and a current transformer 19 is around one of the conductors 13. The electrical signal on the transformer lines 21 is proportional to the current flowing in the conductors 13, 15 and the frequency of the current can also be ascertained from such signal. The lines 21 are coupled to a microcontroller 23 which, in turn, is coupled to a positioning motor 25 described in more detail below.

Figure 3:
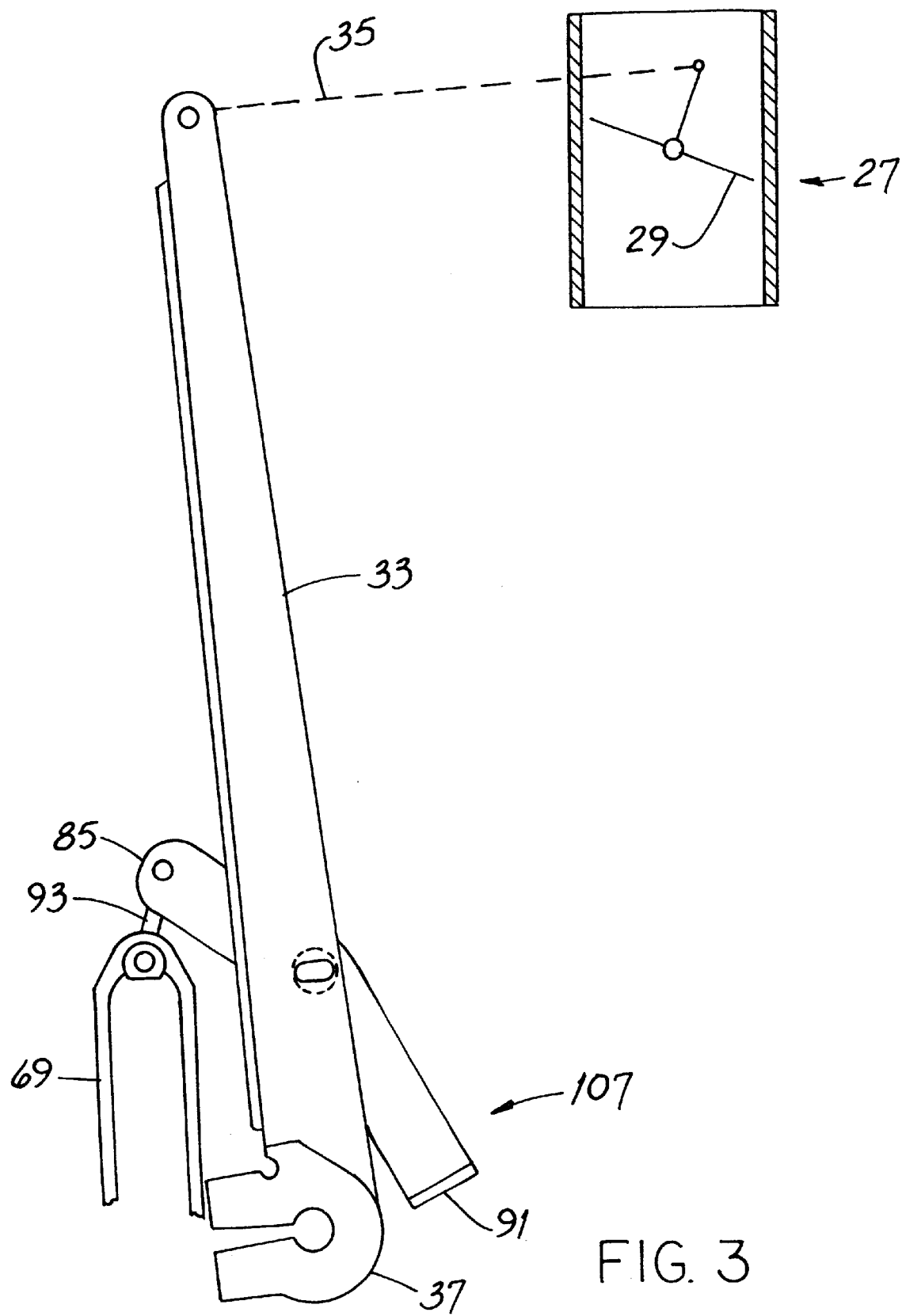
FIG. 3 is a simplified elevation view of the governor apparatus shown in conjunction with an engine fueling mechanism, both set for low engine speed. Parts are broken away, other parts are in section and still other parts are shown in dashed line.
Figure 4:
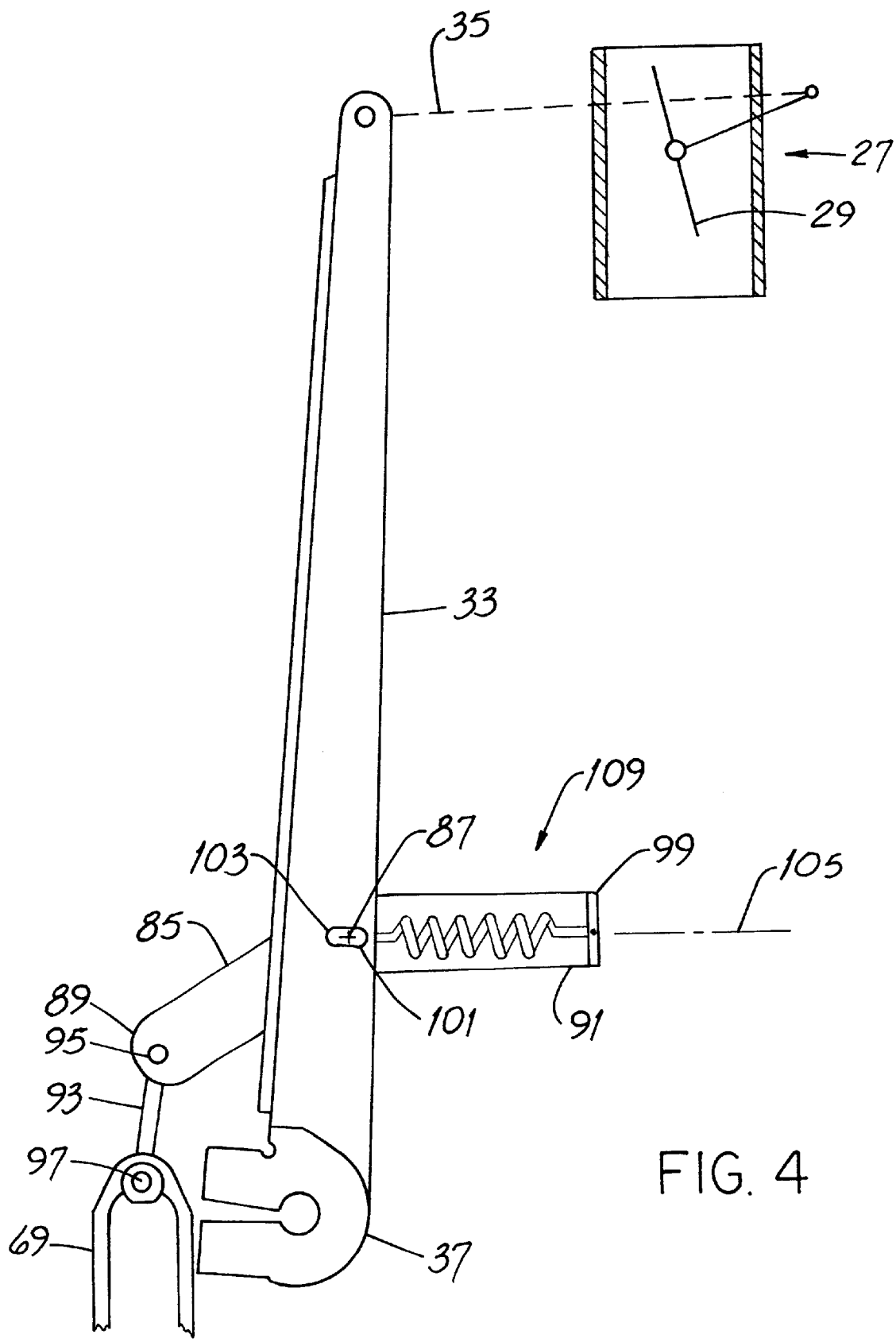
FIG. 4 is a simplified elevation view of the governor apparatus shown in conjunction with an engine fueling mechanism, both set for high engine speed. Parts are broken away, other parts are in section and still other parts are shown in dashed line.
Figure 5:
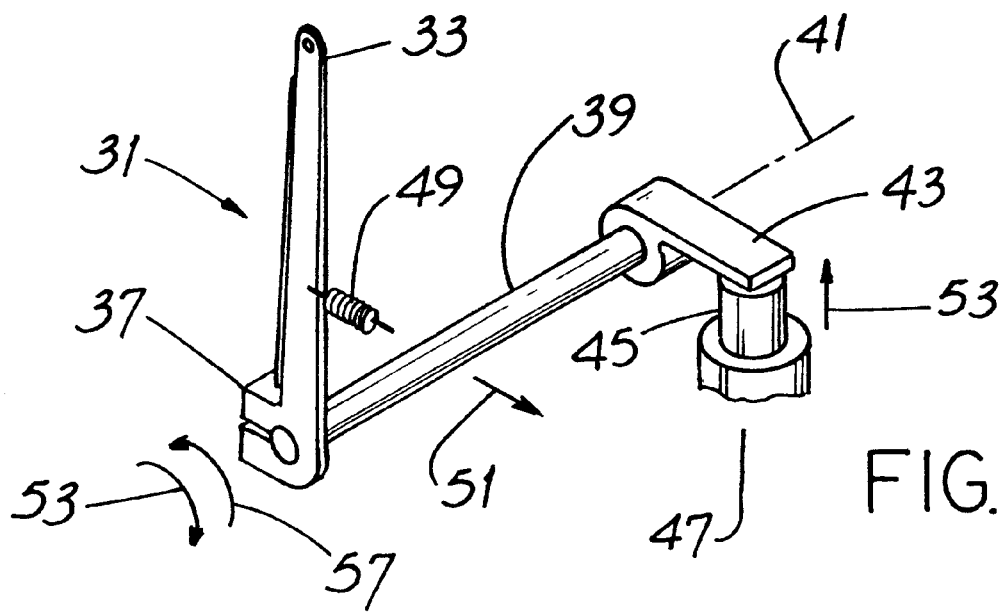
FIG. 5 is a representative perspective view of components of the governor apparatus shown in conjunction with components of a centrifugal governor.

Referring also to FIGS. 3, 4 and 5, the engine 10 includes a fueling mechanism 27, e.g., a carburetor, with a butterfly-type throttle valve 29 which controls the rate of flow of air/fuel mixture to engine 10. When valve 29 is in the position shown in FIG. 3, engine 10 runs at low speed, and when valve 29 is in the position shown in FIG. 4, engine 10 runs at maximum speed. Of course, engine speed can be anywhere between minimum and maximum, depending upon the position of valve 29.

The engine 10 also has a governor apparatus 31 including an elongate linkage arm 33 coupled by one or more rigid rods 35 to the throttle valve 29. The arm 33 is formed with (or rigidly attached to) a clevis 37 clamped to one end of an operating rod 39 which rotates about the axis 41 through a small arc. The other end of the rod is fitted with a lever 43 and the moving component 45 of a centrifugal governor 47 bears against such lever 43.

Referring particularly to FIG. 5, the general operating principle of the illustrated mechanism is as follows. When the engine 10 is not running, the component 45 is downward in its repose position. The spring 49 (which, in FIG. 5, exerts a force in the direction of the arrow 51 to urge the linkage arm 33 and rod 39 in the direction represented by the arrow 53) causes the butterfly valve 29 to be wide open as shown in FIG. 4.

When the engine 10 starts and runs, the component 45 moves upwardly in the direction represented by the arrow 53, pushes the lever 43 and urges the rod 39 and linkage arm 33 in the direction represented by the arrow 57. The position of the component 45 is a function of engine speed and for any engine speed, the torques applied to the rod 39 by (a) the component 45 and lever 43, and (b) the arm 33 and spring 49 are in equilibrium. As described below, the equilibrium value is changed in a unique way.

In a specific embodiment, equilibrium change is effected by a positioning apparatus which will now be described in detail. Referring also to FIGS. 6, 7, 8, and 9, the apparatus 59 includes a base 61 and an upstanding guide track 63 mounted thereon and comprising a pair of spaced-apart rails 65, each having a groove 67 formed therein. The apparatus 59 includes a slide 69, the edges 71 of which are received in the grooves 67 so that when driven as described below, the slide 69 freely moves along and reciprocates in the grooves 67 in the directions of the arrow 73.

Figure 9:
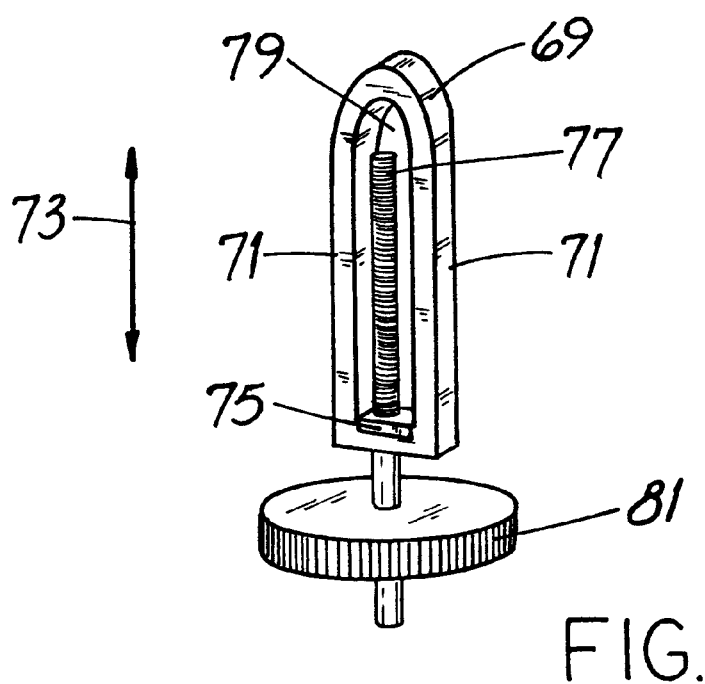
FIG. 9 is a perspective view of the slide, shaft and a gearing component of the positioning apparatus.

A threaded nut 75 is permanently lodged in the slide 69 (by molding the slide 69 and nut 75 as a unitary structure, for example) and a threaded shaft 77 extends through the base 61 and is threaded to the nut 75. The slide 69 has an axial clearance slot 79 so that when the shaft 77 and slide 69 are relatively positioned as shown in FIG. 9, the shaft 77 and the slide 69 are slightly spaced from one another so that the shaft 77 is free to rotate under motor power. A bull gear 81 is affixed to the shaft 77 in a way that the gear 81 and shaft 77 turn in unison.

A motor 25 such as a small DC electric motor is affixed to the base 61 and has a shaft-mounted pinion gear 83. The pinion gear 83 engages the bull gear 81 so that when the motor 25 is energized, the gears 81, 83 rotate and the nut 75 and slide 69 move along the shaft 77, outwardly away from the base 61 or inwardly toward it, depending upon the direction of motor rotation. (It is apparent from the foregoing that the threaded shaft 77 exhibits rotational but not axial movement.)

Referring now to FIGS. 2, 3, 4, and 10, the governor apparatus 31 includes a control arm 85 mounted for pivoting movement about a pivot axis 87. In a specific embodiment, the control arm 85 has a control end 89, a spring end 91 and the pivot axis 87 between the ends 89, 91. That is, the control arm 85 is a first class lever.

The control end 89 and the slide 69 are coupled together by a rigid rod 93 having ends bent at right angles and inserted through apertures 95, 97 in the control end and the slide 69, respectively. A way to help assure that there is little or no "backlash" is to cooperatively size the rod ends and the apertures 95, 97 to fit with no "play." And those of skill in the art will recognize other ways to eliminate backlash.

Figure 10:
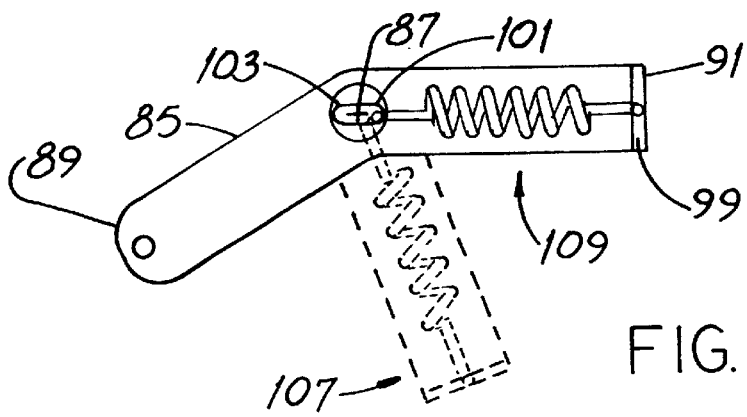
FIG. 10 is a representative view of the two extreme positions of the control arm and spring used in the new governor apparatus. One position is shown in dashed outline.

The spring end 91 includes a foot member 99 bent at a right angle to the arm 85 and the spring 49 is coupled between the foot member 99 and an attachment point 101 afforded by one of the elongate slots 103 in the linkage arm 33. In a highly preferred embodiment, the slot 103 to which the spring 49 is coupled and the pivot axis 87 are substantially aligned with one another as shown in FIGS. 4 and 10.

Any force acting along the axis 105 in the direction of the arrow 51 in FIG. 5 will urge the throttle valve 29 open, i.e. in a direction to increase the speed of the engine 10. And engine speed is generally proportional to the magnitude of such force, i.e., a greater force along the axis 105 results in a higher engine speed up to the maximum available speed.

Figure 12:
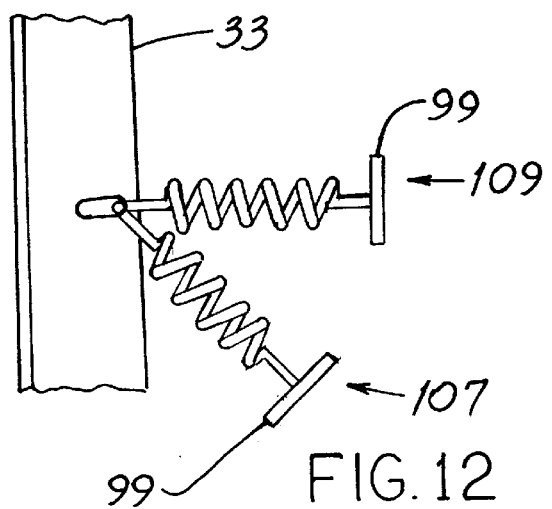
FIG. 12 is a representative view, generally like that of FIG. 10, showing the two extreme positions of the spring and a component of the control arm used in the new governor apparatus. Parts are broken away.
Figure 11:
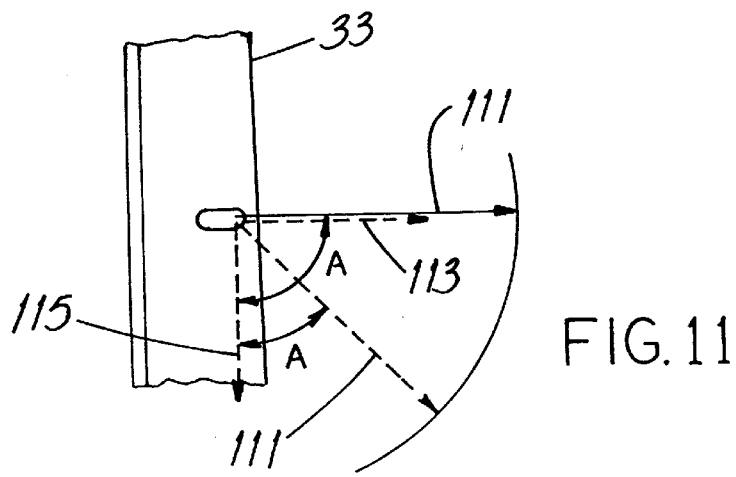
FIG. 11 is a representation showing vector forces acting on the apparatus linkage arm. Parts are broken away and certain vectors are shown in dashed line.

The following discussion involves vectors. A vector is a quantity, e.g., a force, which has both magnitude and direction. Vectors are represented graphically by an arrow having both length (representing magnitude) and direction. In FIG. 11, the vector 111 at its dashed-line position has been "resolved" into vector components 113 and 115. The effect of the vector components 113, 115 on the linkage arm 33 is identical to the effect of the vector 111 in its dashed-line position. The solid-line vector 111 in FIG. 11 results when the arm 85 is in the position 109 shown in FIG. 12. The dashed line vector 111 (or, in the alternative, its components 113, 115) result when the arm 85 is in the position 107 shown in FIG. 12.

Particularly considering FIGS. 3, 4, 10 and 12, it is apparent that when the control arm 85 is moved from the position 107 toward and to the position 109, the magnitude of the vector force imposed on the arm 33 by the spring 49 and represented by the vector 111 does not change or at least does not change appreciably. (This is graphically represented by the fact that the vector 111 has the same length—or substantially so—irrespective of whether the vector 111 is at the solid-line position or the dashed-line position shown in FIG. 11.) It is also apparent that when the control arm 85 is in the position 107, the magnitude of the vector force component, represented by the dashed vector 113, acting along axis 105 to increase engine speed, is less that the magnitude of the force represented by the vector 111 at its solid-line position.

To put it in other words, the engine 10 runs more slowly with the control arm 85 in the position 107 and accelerates as the control arm 85 moves toward and to the position 109. And it is further apparent that the included angle "A" between the linkage arm 33 and the vector 111 (such vector 111 being a representation of spring force and direction) changes with changes in the position of the control arm.

Further considering FIGS. 2, 3, 4, 6, 7, 8, 9, 11 and 12, when the motor 25 is rotated in a first direction, the nut 75 and slide 69 move upwardly, the arm 85 moves toward the position 107 shown in FIG. 3, the included angle "A" decreases and engine speed decreases. When the motor 25 is rotated in the second direction, the nut 75 and slide 69 move downwardly, the arm 85 moves toward the position 109 shown in FIG. 4, the included angle "A" increases and engine speed increases.

Figure 13:
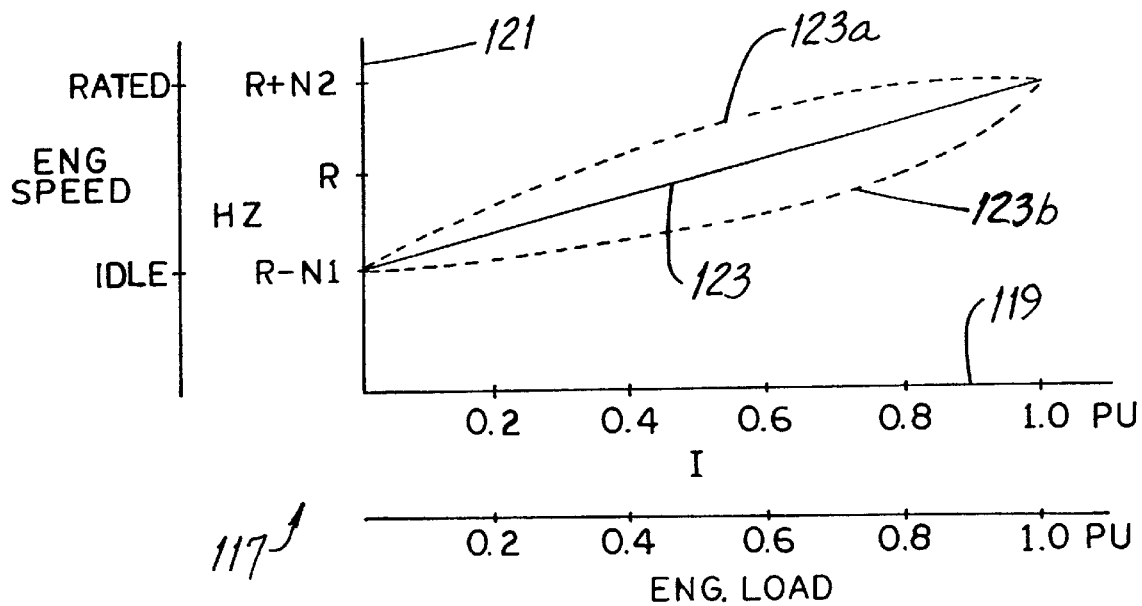
FIG. 13 is a graph representing a current-and-frequency look up table embedded in a microcontroller used in the new apparatus.

Referring to FIGS. 1–13 and, particularly, to FIG. 13, the microcontroller has what is termed a "current-and-frequency look up table" embedded in it. Such table is a representation of those portions of the graph comprising the horizontal axis (I), the vertical axis (Hz) and the graph line.

In the graph, the horizontal axis is arranged in the well-known "per unit" system in which 1.0 PU means full load current, 0.6 PU means 0.6 of full load current and so forth. Similarly, along the vertical axis, the point R means rated frequency, the point R–N1 means rated frequency R reduced by some value N1 and the point R+N2 means rated frequency R increased by some value N2 which may or may not be equal to N1. In a specific exemplary embodiment, full load current is 16 amperes, rated frequency is 60 Hz and N1 and N2 are both equal to 3 Hz.

FIG. 13 also correlates engine speed and engine load with frequency and load current. Where no current is being demanded from the generator 11, that portion of engine load relating to current magnitude is substantially zero, the corresponding frequency is R–N1, 57 Hz in a specific example, and the engine 10 runs at idle speed. If the current demand increases to, e.g., 0.5 PU, the look up table indicates that the required frequency is 60 Hz. The generator frequency is a function of engine speed and the microcontroller 23 causes the slide 69 and control arm 85 to move and increase engine speed to a value at which the frequency of the current is 60 Hz.

Aspects of the invention also involve a method for controlling the speed of an engine 10 driving a generator 11 which supplies electrical current to a load 17. The method includes monitoring the magnitude of the current to the load 17, increasing the engine speed when the current increases and decreasing such speed when the current decreases. The increasing step includes increasing the speed to a maximum speed when the current increases to a predetermined value such as rated generator full load current. The decreasing step includes decreasing the speed to a minimum speed, e.g., engine idle speed or thereabouts, when the current decreases to a predetermined value, e.g., zero amperes or near zero.

More specifically, the method involves an AC generator 11, the output current of which has a frequency. For geographical areas where commercial power is at 60 Hz (and clocks and other products are configured in anticipation of such frequency), the frequency at the maximum speed is not in excess of about 65 Hz. And the frequency at the minimum speed is not less than about 55 Hz. In a highly preferred method, the frequencies at maximum and minimum speeds are about 63 Hz and 57 Hz, respectively. And where commercial power is at 50 Hz, the frequency at the maximum speed is not in excess of about 55 Hz and the frequency at the minimum speed is not less than about 45 Hz.

In other aspects of the method, the engine 10 has a throttle valve 29 controlling the rate of fuel flow to the engine 10. It also has a governor apparatus 31 with a linkage arm 33 coupled to the throttle valve 29. A force is applied to the linkage arm 33 along a vector 111 and the linkage arm 33 and the vector 111 define an included angle "A" between them. The increasing step includes increasing the included angle "A" and the decreasing step includes decreasing the included angle "A".

It is most preferable to configure the governor apparatus 31 with the control arm 85 mechanically coupled to a positioning motor 25 and its apparatus 59. This "bell crank" arrangement permits one to use a positioning motor which is very small and of low power. In this configuration, the force is applied by a spring 49 extending between the linkage arm 33 and the control arm 85. When a positioning motor 25 is used, the increasing step includes powering the positioning motor 25 in a first direction and the decreasing step includes powering the positioning motor 25 in a second direction. Most preferably, spring 49 is indirectly coupled between the motor 25 and the linkage arm 33 and the force is applied by the spring 49.

In another aspect of the method, the governor apparatus includes the microcontroller 23 having a current-and-frequency look-up table embedded in it. The engine 10 runs at a low first speed, e.g., idle, during at least a part of the monitoring step. The increasing step includes detecting an increase in the current to a value, determining from the look-up table the frequency corresponding to the value and increasing the speed of the engine 10 until the frequency of the current is the frequency corresponding to the value.

Figure 14:
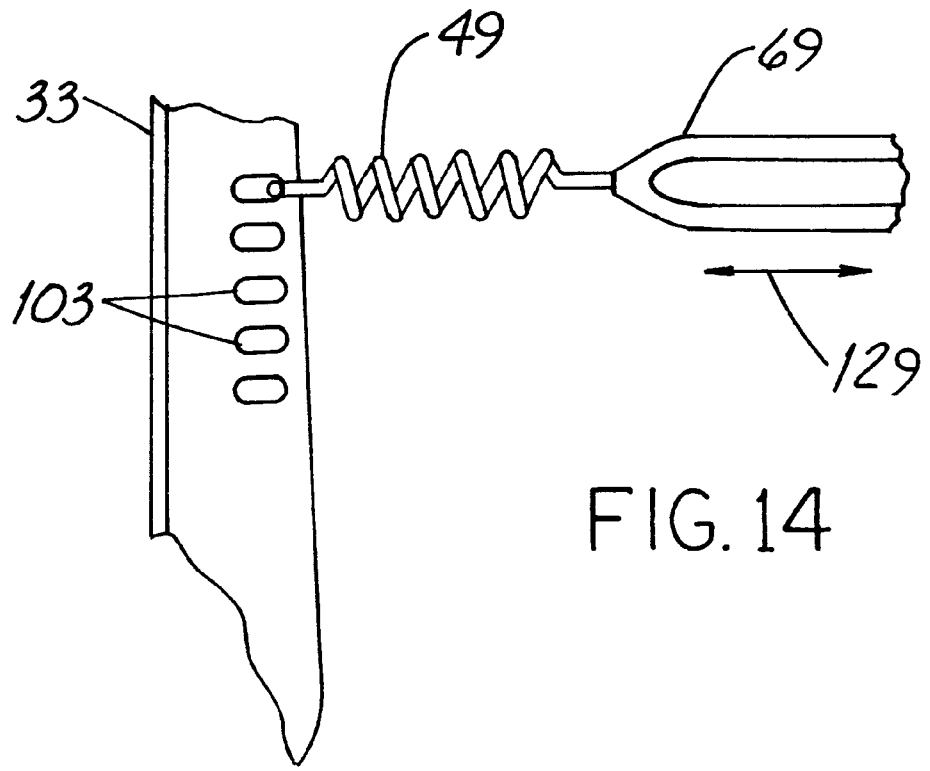
FIG. 14 is a representative view showing an alternate embodiment of the new governor apparatus. Parts are broken away.
Figure 6:
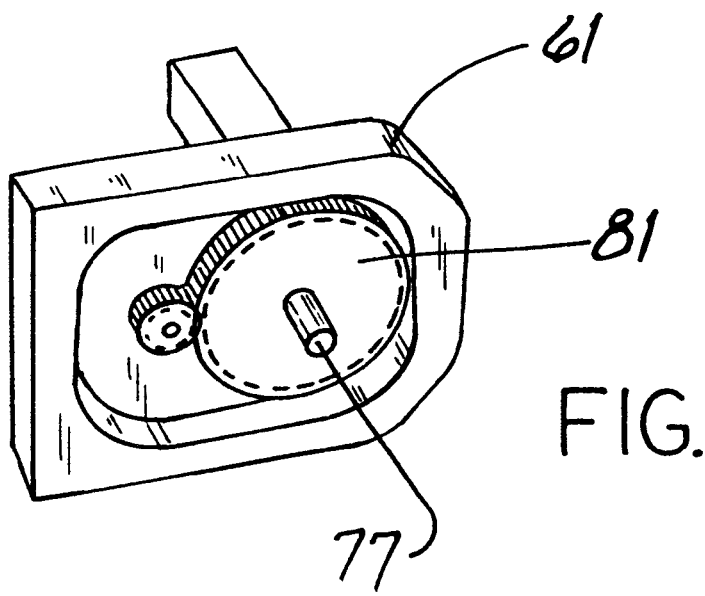
FIG. 6 is a bottom perspective view of aspects of an exemplary positioning apparatus related to the invention. The base cover of the apparatus is omitted and surfaces of parts are shown in dashed outline.

While the principles of the invention have been shown and described in connection with a few preferred embodiments, it is to be understood clearly that such embodiments are by way of example and are not limiting. For example, referring to FIGS. 7 and 14, the positioning apparatus 59 can be arranged so that its slide 69 is aligned with and connected directly to the spring 49. Movement of the slide 69 in the directions indicated by the arrow 129 changes the force applied by the spring 49 to the linkage arm 33.

Figure 7:
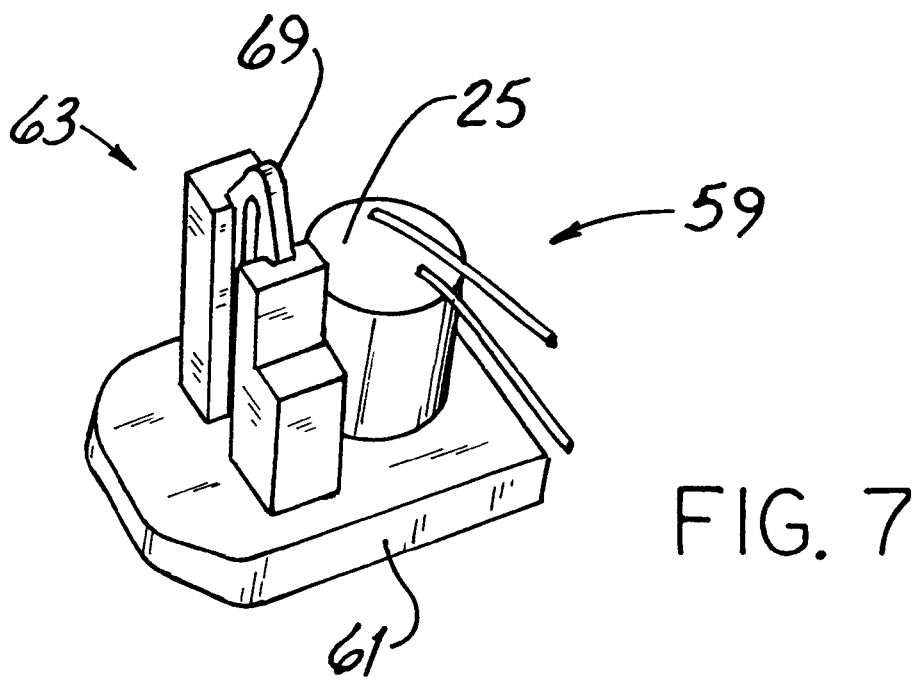
FIG. 7 is a top perspective view of the positioning apparatus of FIG. 6.
Figure 8:
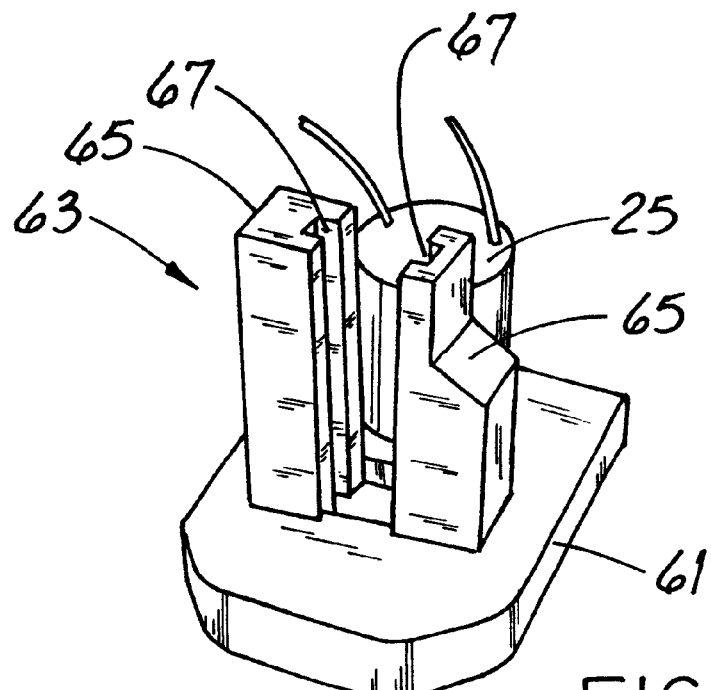
FIG. 8 is a top perspective view generally like that of FIG. 7 except with components of the positioning apparatus omitted.
Figure 15:
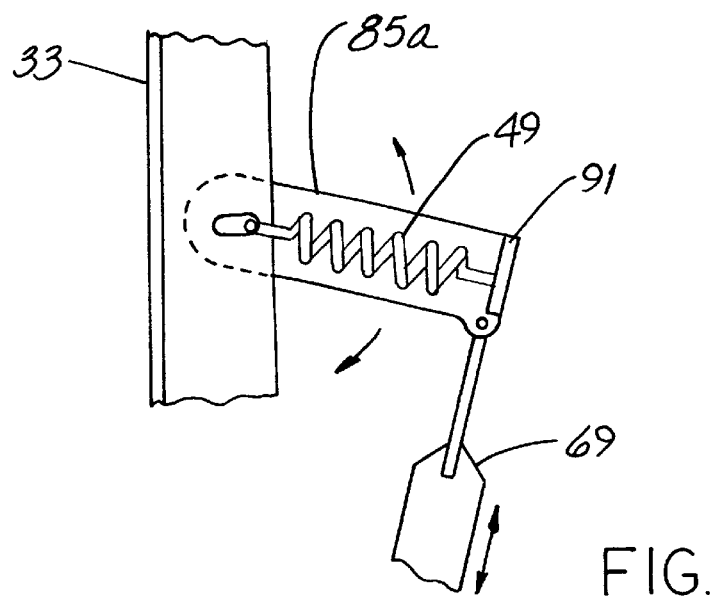
FIG. 15 is a representative view showing another alternate embodiment of the new governor apparatus. Parts are broken away.

As another example, referring to FIGS. 7 and 15, the positioning apparatus 59 can be arranged so that its slide 69 is angular to the spring 49. The slide 69 and spring 49 may be indirectly connected to one another by connecting both to the spring end 91 of a pivoting arm 85a. Or the slide 69 may be connected directly to the spring 49. (Persons of ordinary skill in the art will recognize that certain of these arrangements will result in side loading on the slide 69 and rails 65.)

As yet another example, the current-and-frequency look up table need not represent a graph line 123 which is straight. Such table could represent other, curved graph lines such as lines 123a or 123b, to cite only two of many possible examples.

What is claimed:

1. A method for controlling the speed of an engine driving a generator which supplies AC electrical current having a magnitude and frequency, to a load, the method including the steps of:

monitoring the magnitude and the frequency of the AC electrical current supplied to the load;

providing a user desired frequency corresponding to the magnitude of the current; and changing the engine speed until the frequency of the AC electrical current is substantially identical to the user desired frequency, the changing step including:

increasing the engine speed when the magnitude of the AC electrical current increases; and decreasing the engine speed when the magnitude of the AC electrical current decreases.

2. The method of claim 1 wherein the increasing step includes increasing the engine speed to a maximum speed when the magnitude of the AC electrical current increases to a predetermined value.

3. The method of claim 2 wherein the frequency of the AC electrical current at the maximum speed is not in excess of about 65 Hz.

4. The method of claim 2 wherein the frequency of the AC electrical current at the minimum speed is not less than about 55 Hz.

5. The method of claim 2 wherein the engine has a predetermined maximum speed and a predetermined minimum speed and wherein:
  the frequency of the AC electrical current at the maximum speed is not in excess of about 55 Hz; and
  the frequency of the AC electrical current at the minimum speed is not less than about 45 Hz.

6. The method of claim 1 wherein the decreasing step includes decreasing the engine speed to a minimum speed when the magnitude of the AC electrical current decreases to a predetermined value.

7. A method for controlling the speed of an engine driving a generator which supplies electrical current to a load, the engine including (a) a throttle valve controlling the rate of fuel flow to the engine, and (b) governor apparatus having a linkage arm coupled to the throttle valve, the method including the steps of:
  monitoring the current;
  increasing the speed when the current increases; and
  decreasing the speed when the current decreases, and wherein:
    a force is applied to the linkage arm along a vector; and
    the linkage arm and the vector define an included angle therebetween, the increasing step including increasing the included angle.

8. The method of claim 7 wherein the decreasing step includes decreasing the included angle.

9. The method of claim 8 wherein the governor apparatus includes a control arm coupled to a positioning apparatus and the force is applied by a spring extending between the linkage arm and the control arm.

10. The method of claim 9 wherein the positioning apparatus includes a positioning motor and:
  the increasing step includes powering the positioning motor in a first direction; and
  the decreasing step includes powering the positioning motor in a second direction.

11. The method of claim 10 wherein:
  the governor apparatus includes a microcontroller having a current-and-frequency look-up table embedded therein; and
  the engine runs at a first speed during at least a part of the monitoring step; and wherein the increasing step includes:
    detecting an increase in the current to a value; and wherein the determining step includes:
      determining from the look-up table the frequency corresponding to the value; and wherein the increasing step includes:
        increasing the speed of the engine until the frequency of the current is the frequency corresponding to the value.

12. The method of claim 8 wherein:
  the governor apparatus includes a positioning apparatus and a spring coupled between the apparatus and the linkage arm; and
  the force is applied by the spring.

13. The method of claim 12 wherein the positioning apparatus includes a positioning motor and:
  the increasing step includes powering the positioning motor in a first direction; and
  the decreasing step includes powering the positioning motor in a second direction.

14. In the combination of (a) an electrical generator and having an output terminal and (b) an internal combustion engine powering the generator, and wherein the engine includes a throttle valve controlling the rate of fuel flow to the engine, the improvement comprising a governor apparatus including:
  a linkage arm coupled to the throttle valve;
  a spring applying a vector force to the linkage arm;
  a motor mounted with respect to the engine for changing the angle of the vector force with respect to the linkage arm; and
  a current transformer detecting the current through the output terminal; wherein:
    the vector force and the linkage arm define an included angle therebetween; and
    the motor causes the included angle to increase when the current increases, thereby increasing the speed of the engine.

15. The combination of claim 14 wherein the governor apparatus includes:
  a control arm mounted for pivoting movement about a pivot axis;
  the spring is coupled between the control arm and an attachment point on the linkage arm; and
  the pivot axis and the attachment point are substantially aligned with one another.

16. The combination of claim 14 further including a microcontroller having a current and frequency look-up table embedded therein and wherein:
  the current transformer, the microcontroller, the arms and the motor coact to increase the frequency of the current when the magnitude of the current increases.

17. In the combination of (a) an electrical generator having an output terminal and (b) an internal combustion engine powering the generator, and wherein the engine includes a throttle valve controlling the rate of fuel flow to the engine, the improvement comprising a governor apparatus including:
  a linkage arm coupled to the throttle valve;
  a spring applying a vector force to the linkage arm; and
  a motor mounted with respect to the engine for changing the angle of the vector force
  with respect to the linkage arm;
  wherein:
    the motor is affixed to a base having guide rails supported thereon;
    a slide is mounted for movement with respect to the rails;
    a threaded nut is affixed to the slide; and
    a shaft rotated by the motor is threaded to the nut, thereby extending and retracting the slide when the motor is rotated in a first or second direction, respectively.

* * * * *